(12) United States Patent
Fornage et al.

(10) Patent No.: US 7,899,632 B2
(45) Date of Patent: Mar. 1, 2011

(54) METHOD AND APPARATUS FOR ANTI-ISLANDING OF DISTRIBUTED POWER GENERATION SYSTEMS

(75) Inventors: Martin Fornage, Petaluma, CA (US); Mudhafar Hassan-Ali, Petaluma, CA (US); Tibor Bolfan, Rohnert Park, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 12/218,752

(22) Filed: Jul. 16, 2008

(65) Prior Publication Data

US 2009/0021877 A1 Jan. 22, 2009

Related U.S. Application Data

(60) Provisional application No. 60/959,644, filed on Jul. 16, 2007.

(51) Int. Cl.
*G01R 13/02* (2006.01)
(52) U.S. Cl. .......................... 702/69; 702/79; 702/189; 702/198; 363/15; 363/141; 363/145; 361/78; 327/365; 318/78
(58) Field of Classification Search .................. 702/57, 702/60, 69, 79, 189, 198; 361/78; 318/106, 318/107, 108; 363/15, 141, 142, 145; 327/365
See application file for complete search history.

(56) References Cited

U.S. PATENT DOCUMENTS

| | | | |
|---|---|---|---|
| 4,626,983 A | 12/1986 | Harada et al. | |
| 6,031,736 A | 2/2000 | Takehara et al. | |
| 6,046,919 A | 4/2000 | Madenokouji et al. | |
| 6,201,180 B1 | 3/2001 | Meyer et al. | |
| 6,219,623 B1 | 4/2001 | Wills | |
| 6,351,400 B1 | 2/2002 | Lumsden | |
| 6,678,176 B2 | 1/2004 | Lumsden | |
| 6,809,942 B2 | 10/2004 | Madenokouji et al. | |
| 6,853,940 B2 | 2/2005 | Tuladhar | |
| 7,106,564 B2 | 9/2006 | Deng et al. | |
| 7,138,728 B2 | 11/2006 | LeRow et al. | |

(Continued)

FOREIGN PATENT DOCUMENTS

JP 55-031310 A 3/1980

(Continued)

OTHER PUBLICATIONS

Alexa et al., 'DC/AC Three phase converter with resonant circuit at the input and intermediate RF circuit for supplying a three asynchronous motor', 1995, Springer-Verlag, pp. 195-200.*

(Continued)

*Primary Examiner*—Mohamed Charioui
*Assistant Examiner*—Elias Desta
(74) *Attorney, Agent, or Firm*—Moser IP Law Group (57) ABSTRACT

A method and apparatus for anti-islanding of distributed power generation systems having an inverter comprising a phase locked loop (PLL), a phase shift generator for injecting a phase shift into the PLL during at least one sample period, and a phase error signature monitor for monitoring at least one phase error response of the PLL during the at least one sample period.

21 Claims, 9 Drawing Sheets

U.S. PATENT DOCUMENTS

| | | | |
|---|---|---|---|
| 7,432,618 | B2 | 10/2008 | Taylor |
| 2004/0178641 | A1* | 9/2004 | Wall .............................. 290/52 |
| 2005/0187752 | A1* | 8/2005 | Colby et al. .................. 703/19 |
| 2006/0244265 | A1* | 11/2006 | Ichinose et al. ............... 290/44 |
| 2008/0122293 | A1 | 5/2008 | Ohm |

FOREIGN PATENT DOCUMENTS

| | | |
|---|---|---|
| JP | 59-119521 A | 7/1984 |
| JP | 61-009058 A | 1/1986 |
| JP | 07-201136 A | 8/1995 |

OTHER PUBLICATIONS

Deng et al., 'STATCOM model in EMTP RV using Hysteresis Current Controlled Voltage Source Converter (VSC)', 2005, IEEE Publication, pp. 517-522.*

International Search Report and Written Opinion mailed Feb. 24, 2009 for PCT Application No. PCT/US2008/008712.

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009.

"IEEE Recommended Practice for Utility Interface of Photovoltaic (PV) Systems," IEEE Std 929-2000, Approved Jan. 30, 2000, Copyright 2000 by the Institute of Electrical and Electronics Engineers Inc.

Bower, Ward et al., "Performance Test Protocol for Evaluating Inverters Used in Grid-Connected Photovoltaic Systems," Draft Oct. 2004.

Bower, Ward and Ropp, Michael, "Evaluation of Islanding Detection Methods for Utility-Interactive Inverters in Photovoltaic Systems," Sandia Report, SAND2002-3591, Nov. 2002.

Jeraputra, Chuttchaval and Enjeti, Prasad N., "Development of a Robust Anti-Islanding Algorithm for Utility Interconnection of Distributed Fuel Cell Power Generation," IEEE Transactions on Power Electronics, vol. 19, No. 5, Sep. 2004, pp. 1163-1170.

De Mango, Francesco et al., "Overview of Anti-Islanding Algorithms for PV Systems. Part II: Active Methods," IEEE, EPE-PEMC 2006, Portorož, Slovenia, pp. 1884-1889.

Bower, Ward Isaac, "The AC PV Building Block Ultimate Plug-n-Play That Brings Photovoltaics Directly to the Customer," U.S. Department of Energy Contract DE-AC04-94AL85000, published Feb. 1, 2003.

Bower, Ward I. et al., "Innovative Micro-Inverter for the AC PV Building Block or AC Modules," Copyright 2005 by ASME.

Xue, Yaosuo et al., "Topologies of Single-Phase Inverters for Small Distributed Power Generators: An Overview," IEEE Transactions on Power Electronics, vol. 19, No. 5, Sep. 2004, pp. 1305-1314.

"IEEE Standard for Interconnecting Distributed Resources with Electric Power Systems," IEEE Std 1547™-2003, IEEE, Jul. 28, 2003, Copyright 2003 by the Institute of Electrical and Electronics Engineers, Inc.

International Preliminary Report on Patentability and Written Opinion mailed Jan. 28, 2010 for PCT Application No. PCT/US2008/008712.

* cited by examiner

METHOD AND APPARATUS FOR ANTI-ISLANDING OF DISTRIBUTED POWER GENERATION SYSTEMS

CROSS-REFERENCE TO RELATED APPLICATIONS

This application claims benefit of U.S. provisional patent application Ser. No. 60/959,644, filed Jul. 16, 2007, which is herein incorporated by reference.

BACKGROUND OF THE INVENTION

1. Field of the Invention

Embodiments of the present disclosure generally relate to a method and apparatus for anti-islanding of distributed power generation systems.

2. Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ inverters to convert the DC current into an alternating current (AC) and couple the AC current to the commercial power grid. The power produced by such a distributed generation (DG) system can then be sold to the commercial power company.

Under some conditions, a grid-connected DG system may become disconnected from the utility grid, resulting in a potentially dangerous condition known as "islanding". During islanding, the utility cannot control voltage and frequency in the DG system island, creating the possibility of damage to customer equipment coupled to the island. Additionally, an island may create a hazard for utility line workers or the general public by causing a line to remain energized that is assumed to be disconnected from all energy sources. In order to mitigate the potential hazards of islanding, the IEEE standard 929-2000 requires inverters in a DG system detect the loss of the utility grid and shut down the inverter within two seconds. As such, all commercially available inverters, including each micro-inverter of a micro-inverter array, must be equipped with an inverter-based anti-islanding capability. Current techniques employed to meet such a standard require substantial power, thus reducing the efficiency of the inverter.

Therefore, there is a need in the art for a method and apparatus for fast detection of islanding in a grid-connected inverter.

SUMMARY OF THE INVENTION

Embodiments of the present invention generally relate to a method and apparatus for anti-islanding of distributed power generation systems having an inverter comprising a phase locked loop (PLL), a phase shift generator for injecting a phase shift into the PLL during at least one sample period, and a phase error signature monitor for monitoring at least one phase error response of the PLL during the at least one sample period.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
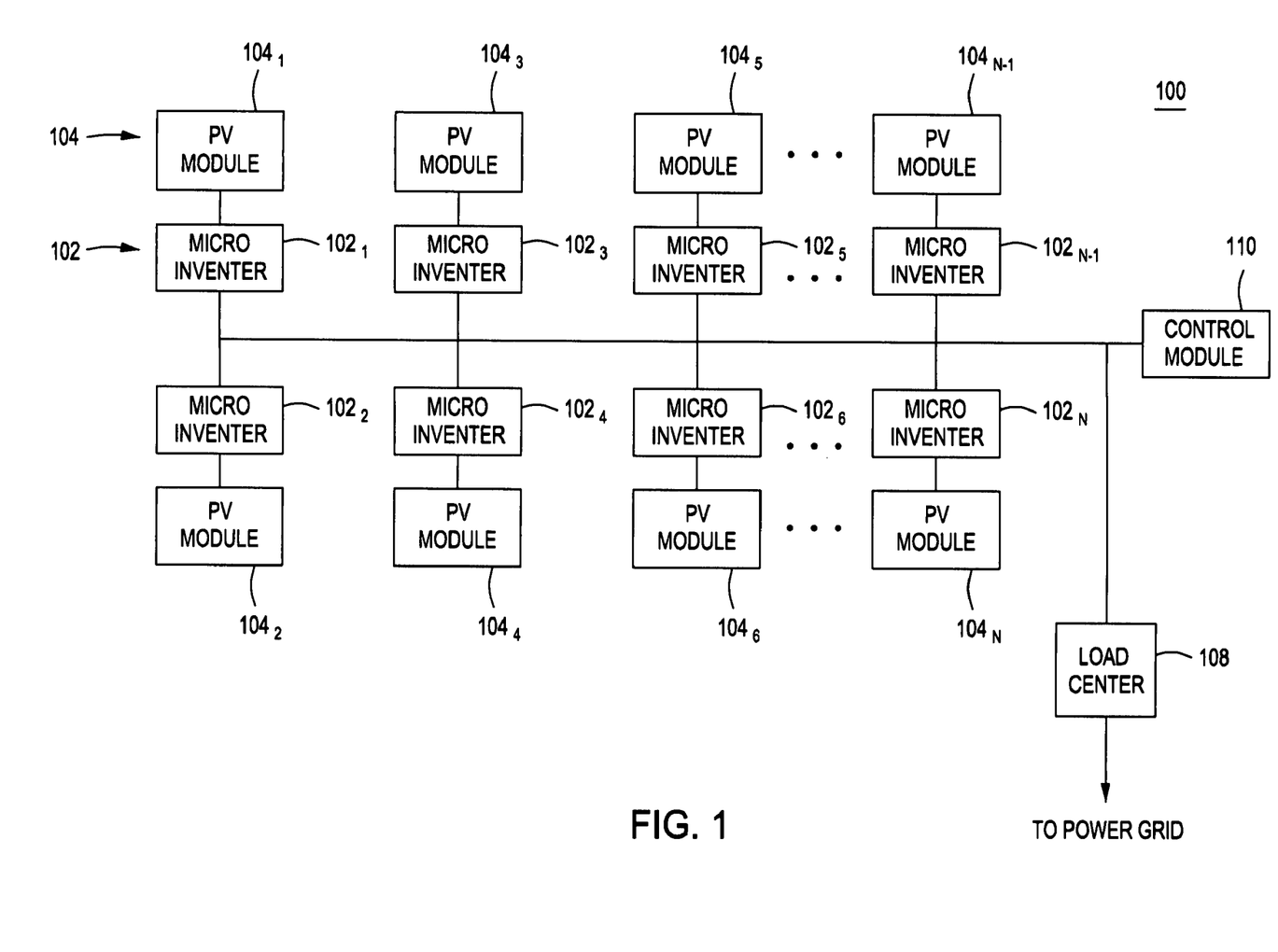
FIG. 1 is a block diagram of a system for distributed generation in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of micro-inverters $102_1, 102_2 \ldots 102_n$, collectively referred to as micro-inverters 102, a plurality of PV modules $104_1, 104_2 \ldots 104_n$, collectively referred to as PV modules 104, an AC bus 106, a load center 108, and an array control module 110.

Each micro-inverter $102_1, 102_2 \ldots 102_n$ is coupled to a PV module $104_1, 104_2 \ldots 104_n$, respectively. The micro-inverters 102 are further coupled to the AC bus 106, which in turn is coupled to the load center 108. The load center 108 houses connections between incoming power lines from a commercial power grid distribution system and the AC bus 106. The micro-inverters 102 convert DC power generated by the PV modules 104 into AC power, and meter out AC current that is in-phase with the AC commercial power grid voltage. The system 100 couples the generated AC power to the commercial power grid via the load center 108.

A control module 110 is coupled to the AC bus 106. The control module 110 is capable of issuing command and control signals to the micro-inverters 102 in order to control the functionality of the micro-inverters 102.

Figure 2:
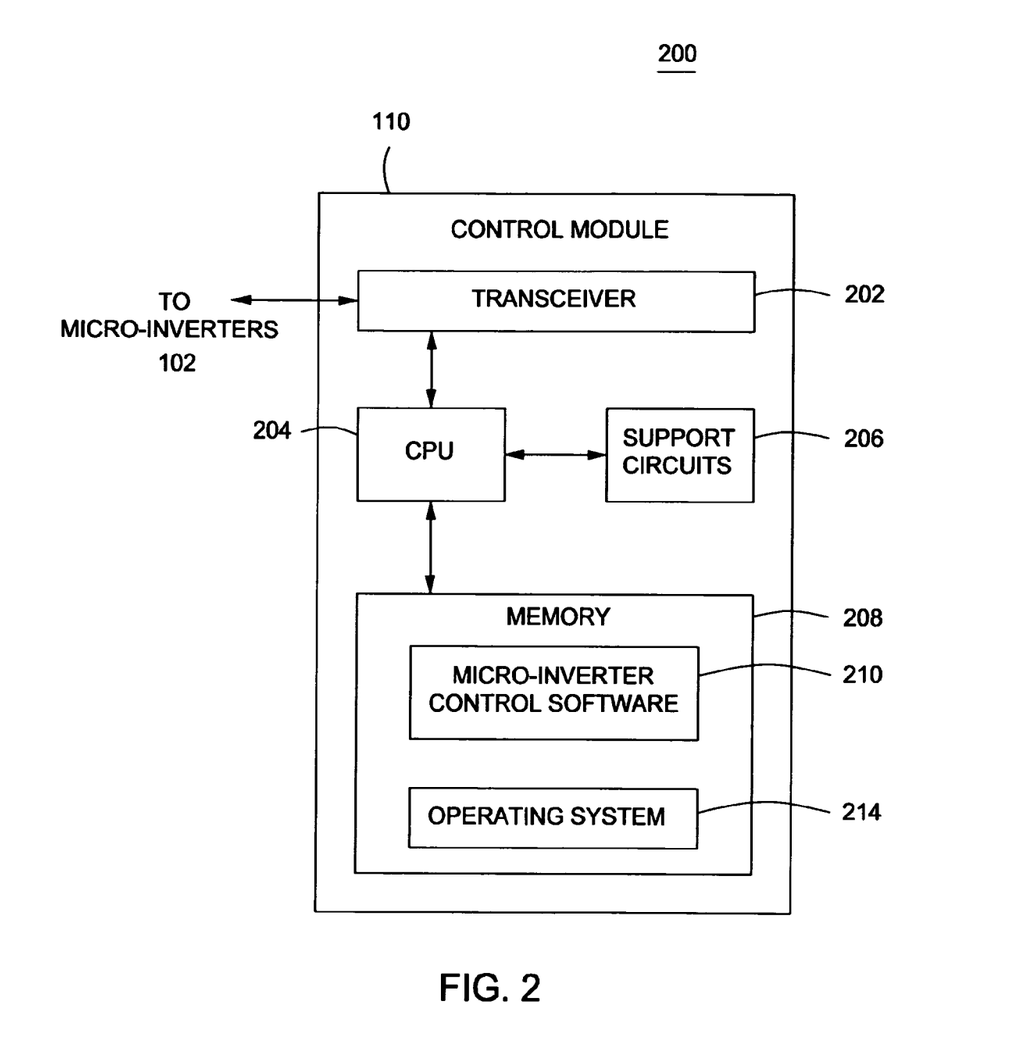
FIG. 2 is a block diagram of a control module in accordance with one or more embodiments of the present invention.

FIG. 2 is a block diagram of a control module 110 in accordance with one or more embodiments of the present invention. The control module 110 comprises a transceiver 202 coupled to at least one central processing unit (CPU) 204. The CPU is additionally coupled to support circuits 206, and a memory 208. The CPU 204 may comprise one or more conventionally available microprocessors. Alternatively, the CPU 204 may include one or more application specific integrated circuits (ASIC). The support circuits 206 are well known circuits used to promote functionality of the central processing unit. Such circuits include, but are not limited to, a cache, power supplies, dock circuits, buses, network cards, input/output (I/O) circuits, and the like.

The memory 208 may comprise random access memory, read only memory, removable disk memory, flash memory, and various combinations of these types of memory. The memory 208 is sometimes referred to as main memory and may, in part, be used as cache memory or buffer memory. The memory 208 generally stores the operating system 214 of the control module 110. The operating system 214 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 208 may store various forms of application software, such as micro-inverter control software 210. The transceiver 202 communicably couples the control module 110 to the micro-inverters 102 to facilitate command and control of the micro-inverters 102. The transceiver 202 may utilize wireless or wired communication techniques for such communication. In one embodiment, the micro-inverter control software 210 synchronizes the anti-islanding hardware and/or software of the micro-inverters 102, which is further described below.

Figure 3:
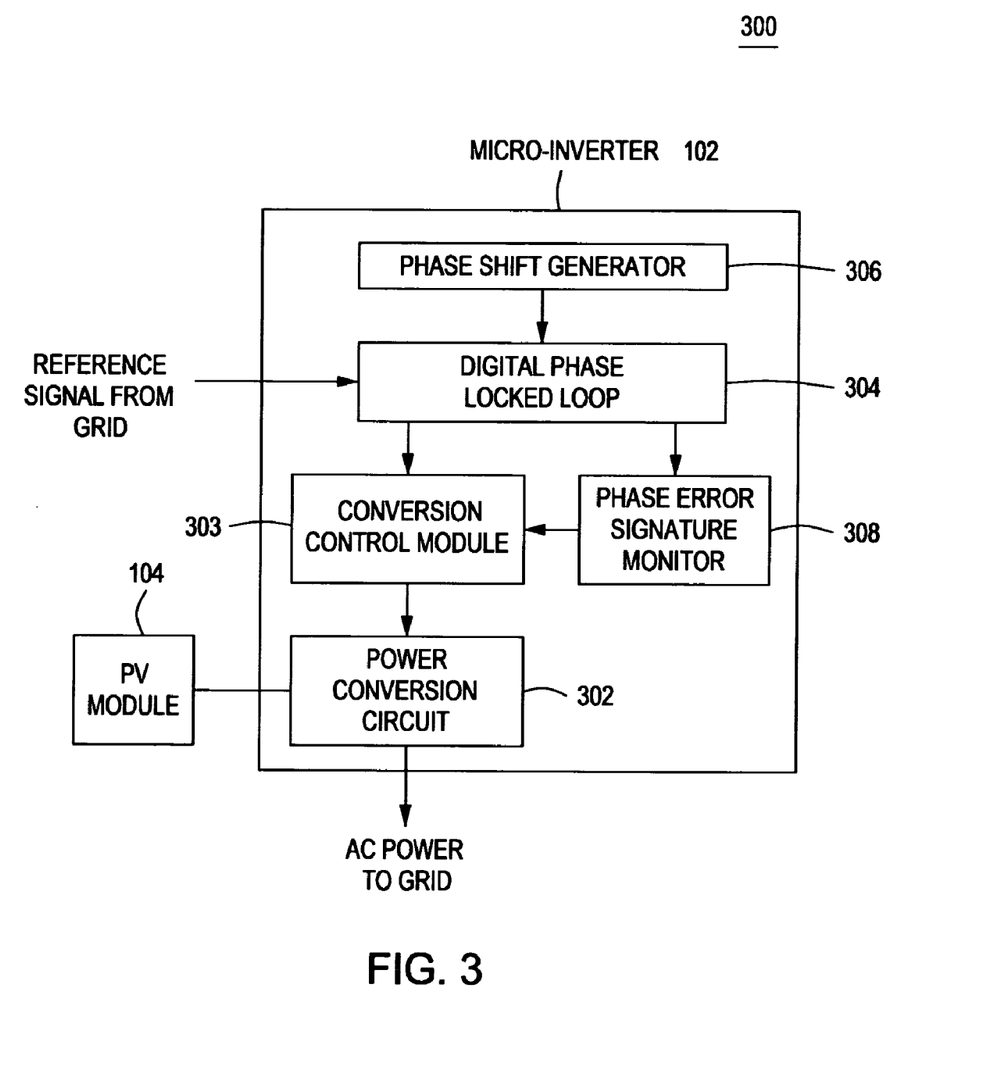
FIG. 3 is a block diagram of a micro-inverter in accordance with one or more embodiments of the present invention.

FIG. 3 is a block diagram of a micro-inverter 102 in accordance with one or more embodiments of the present invention. The micro-inverter 102 comprises a power conversion circuit 302, a conversion control module 303, a digital phase-locked loop (DPLL) 304, a phase shift generator 306, and a phase error signature monitor 308. The DPLL 304 is coupled to the conversion control module 303, the phase shift generator 306, and the phase error signature monitor 308. The conversion control module 303 is further coupled to the phase error signature monitor 308 and the power conversion circuit 302. The power conversion circuit 302 is coupled to the PV module 104 and acts to convert a DC current from the PV module 104 to an AC current; the conversion control module 303 provides operative control of the power conversion circuit 302. The DPLL 304 receives a grid voltage reference signal and locks to the frequency of the grid voltage; additionally the DPLL receives a nominal cycle input that provides the nominal period of the grid system in order to prevent the DPLL 304 from changing when the nominal grid frequency changes. The DPLL 304 provides an input to the conversion control module 303 that drives the power conversion circuit 302 to inject the generated AC output current in phase with the grid as required by the relevant standards.

Figure 6:
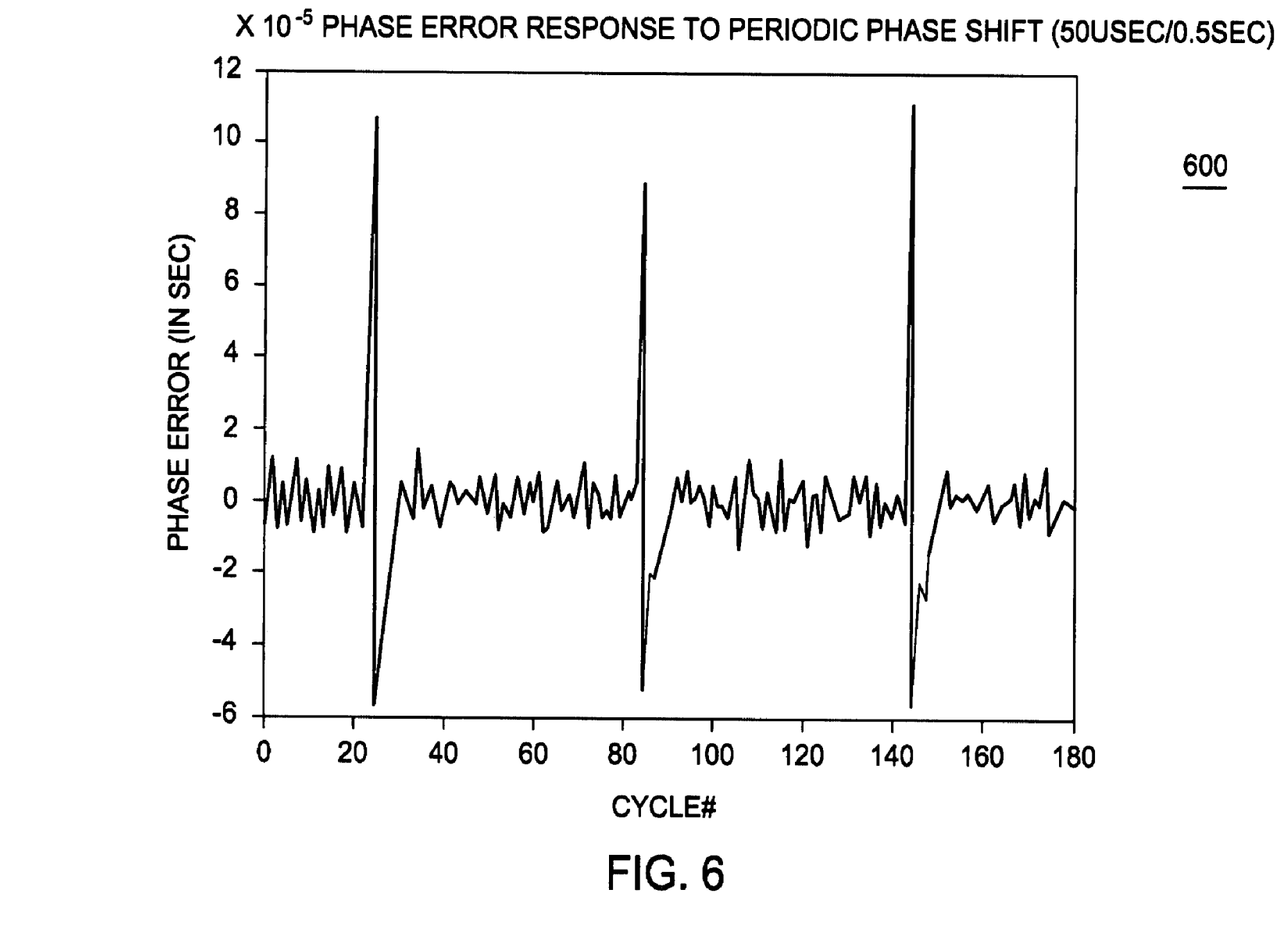
FIG. 6 is a graphical diagram of a phase error response in the presence of a connected grid in accordance with one or more embodiments of the present invention.
Figure 7:
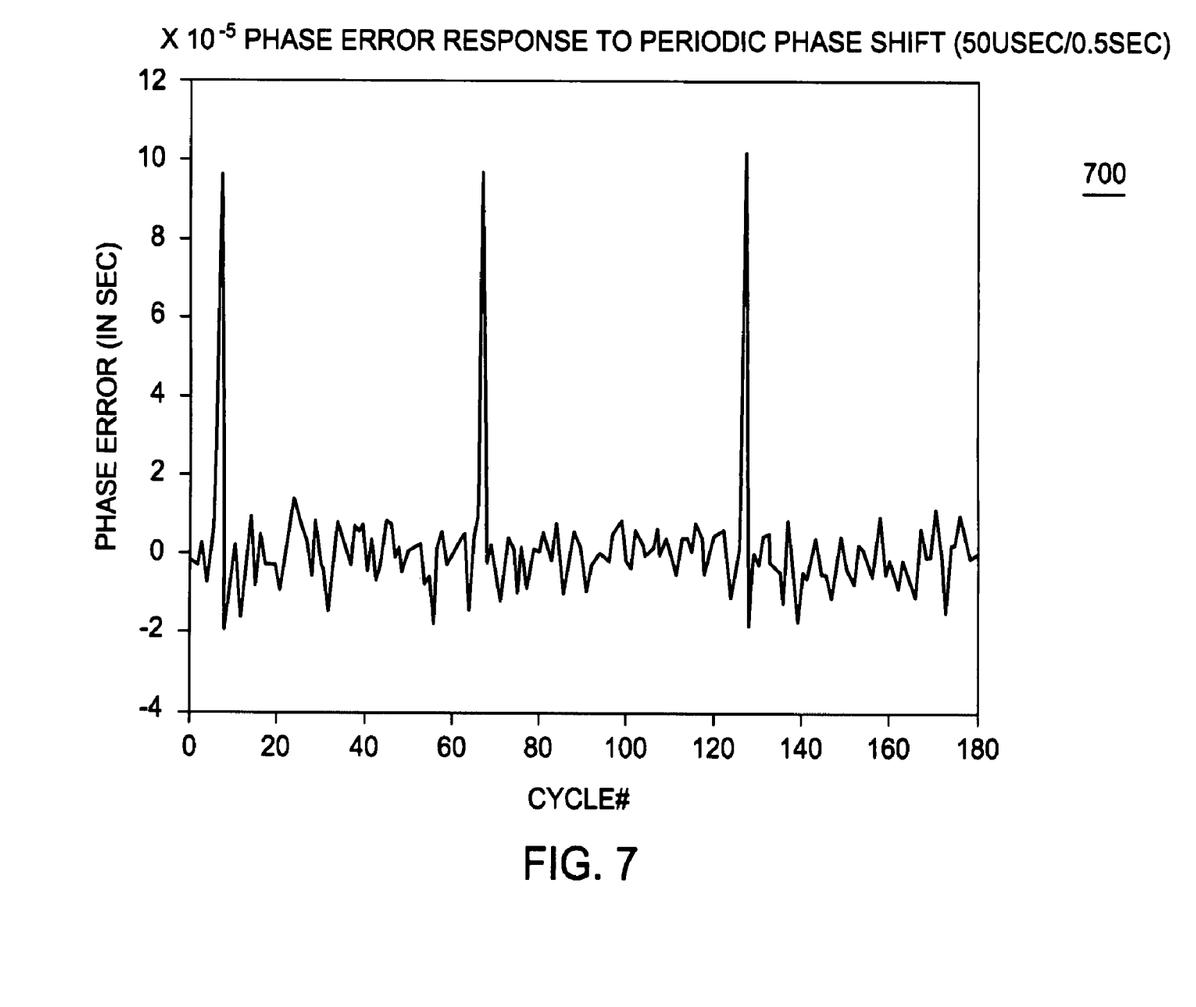
FIG. 7 is a graphical diagram of a phase error response in the absence of a connected grid in accordance with one or more embodiments of the present invention.

The phase shift injector 306 injects a small phase shift through the DPLL 304. In one embodiment, where the connected grid operates at a frequency of 60 Hz, a phase shift of magnitude 50 microseconds over a period of one cycle (i.e., 16.7 milliseconds) is injected at 0.5 second intervals; such an injected phase shift represents a phase shift of one degree and causes an insignificant distortion to the current injected into the grid and/or load. Alternative embodiments may utilize different phase shift magnitudes, durations, and/or injection intervals. While the micro-inverter 102 remains connected to the utility grid, the DPLL 304 produces a certain phase error response as a result of the injected phase shift. If the micro-inverter 102 becomes disconnected from the grid, the DPLL 304 produces a different phase error response as a result of the injected phase shift. Such phase error responses are shown in FIGS. 6 and 7 and further described below. The phase error signature monitor 308 monitors the phase error response of the DPLL 304 to determine when the micro-inverter 102 is no longer connected to the grid, creating an island. In the event of an island, the phase error signature monitor 308 provides a deactivation signal to the conversion control module 303 to shut down the power conversion circuit 302.

Figure 4:
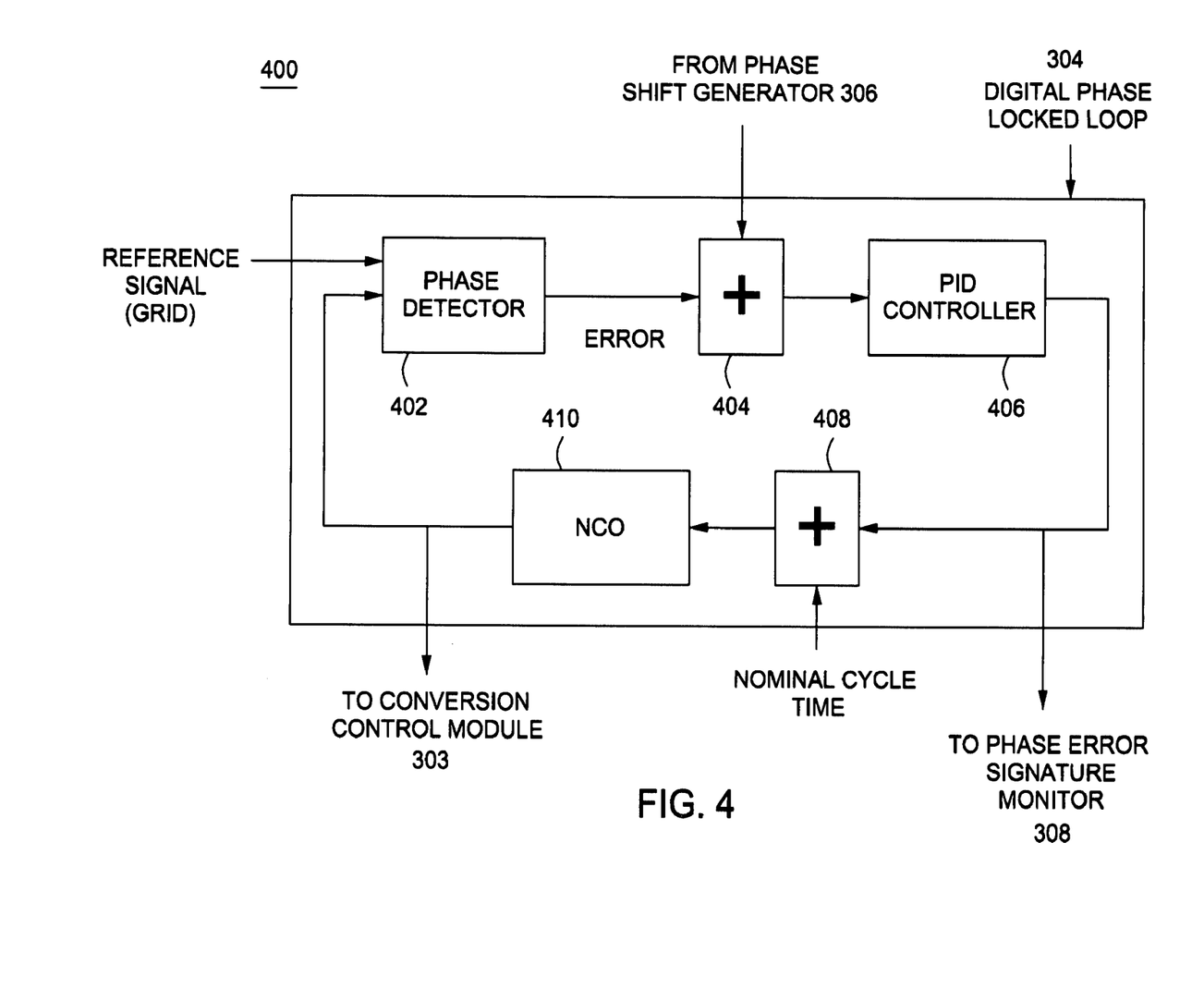
FIG. 4 is a block diagram of a Digital Phase Locked Loop in accordance with one or more embodiments of the present invention.

FIG. 4 is a block diagram of a Digital Phase Locked Loop (DPLL) 304 in accordance with one or more embodiments of the present invention. Such a DPLL 304 can be implemented in hardware, software, or a combination of hardware and software. The DPLL 304 comprises a phase detector 402, an adder 404, a Proportional Integral Derivative (PID) controller 406, an adder 408, and a numerically controlled oscillator (NCO) 410. The phase detector 402 receives a first input from a reference signal of the grid voltage frequency as described above; the output of the NCO 410 is coupled to the phase detector 402 and provides a second input. The output from the NCO 410 and the reference signal of the grid voltage frequency are compared by the phase detector 402 to produce a resulting phase error. This phase error output of the phase detector 402 is coupled to the adder 404 along with the output of the phase shift generator 306. The phase shift generator 306 injects a phase shift as described above. The resulting output of the adder 404 is coupled to the PID controller 406. In one embodiment, the PID controller 406 acts as the loop filter for the DPLL 304; alternative embodiments may comprise other forms of loop filter implementations. The PID controller 406 output comprises a phase error response that is coupled to the phase error signature monitor 308. Additionally, the PID controller 406 output is coupled to the adder 408 along with a nominal cycle time input. In one embodiment, the nominal cycle time is ¹⁄₆₀ seconds. The resulting output of the adder 408 is coupled to the NCO 410. The NCO 410 output, in addition to being coupled to the phase detector 402, is coupled to the conversion control module 303 to drive the generated AC current injection into the grid as described above.

Figure 5:
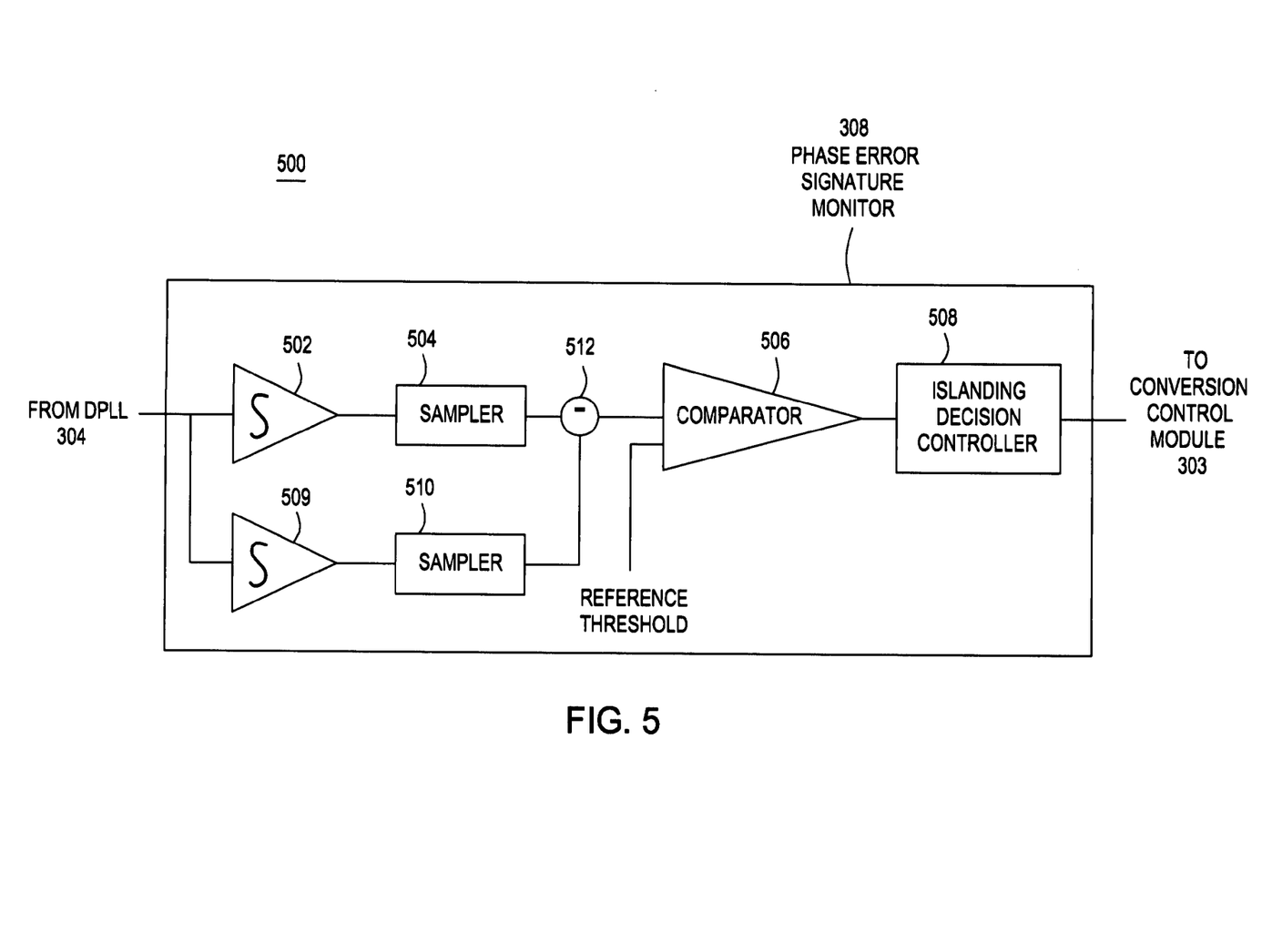
FIG. 5 is a block diagram of a phase error signature monitor in accordance with one or more embodiments of the present invention.

FIG. 5 is a block diagram of a phase error signature monitor 308 in accordance with one or more embodiments of the present invention. Such a phase error signature monitor 308 can be implemented in hardware, software, or a combination of hardware and software. The phase error signature monitor 308 comprises a resettable integrator 502 coupled to a sampler 504, and a resettable integrator 509 coupled to a sampler 510. The outputs of the samplers 504 and 510 are coupled to a subtractor 512. The output of the subtractor 512 is coupled to an input of a comparator 506. A reference threshold input is coupled to a second input of the comparator 506. The output of the comparator 506 is coupled to an islanding decision controller 508.

The phase error response at the output of the PID controller 406 is coupled to the resettable integrators 502 and 509. During a sample period, the resettable integrators 502 and 509 are both reset, and the resettable integrator 509 integrates a baseline phase error response over a baseline period. In one embodiment, the sample period is 0.5 seconds and the baseline period is seven consecutive grid cycles (i.e., 116.667 milliseconds for a 60 Hz grid voltage). Following the baseline period, the sampler 510 samples the output of the integrator 509 and provides the resulting baseline integrated phase error response value to the subtractor 512. Also following the baseline period, a phase shift is injected; in one embodiment, the phase shift is injected during the grid cycle immediately following the baseline period. The resettable integrator 502 integrates the phase error response resulting from the injected phase shift over an integration period. In one embodiment, the integration period is seven consecutive grid voltage cycles immediately following the phase shift injection (e.g., 116.667 milliseconds for a 60 Hz grid voltage). After the integration period, the sampler 504 samples the output of the integrator 502 and provides the resulting integrated phase error response value to the subtractor 512. The subtractor 512 subtracts the baseline integrated phase error response value from the integrated phase error response value resulting from the phase shift injection; the output of the subtractor 512 is provided to an input of the comparator 506. In alternative embodiments where the grid voltage frequency remains stable, the baseline integrated phase error response is not required, and the phase error signature monitor 308 can thusly be implemented without the resettable integrator 509, the sampler 510, and the subtractor 512. In such alternative embodiments, the output of the sampler 504 is coupled to the input of the comparator 506.

The comparator 506 compares the resulting difference to a reference threshold. If the threshold is satisfied, the sample period containing the injected phase shift is considered indicative of a potential grid disconnection. The output of the comparator 506 is coupled to the islanding decision controller 508. The islanding decision controller 508 determines whether "n" out of the "p" most recent sample periods indicate a potential grid disconnection; if this condition is satisfied, an islanding state is declared and the islanding decision controller 508 issues a control signal to the conversion control module 303 to shut down the power conversion circuit 302.

FIG. 6 is a graphical diagram of a phase error response 600 in the presence of a connected grid in accordance with one or more embodiments of the present invention. In the presence of a connected grid, the phase shift injected by the phase shift generator 306 causes an insignificant distortion to the current injected into the grid and produces no voltage impact on the grid. Thus, the grid voltage reference signal to the phase detector 402 does not change as a result of the injected phase shift, and the DPLL 304 compensates for the injected phase error such that the bipolar phase error response 600 is generated. Integrating the bipolar phase error response 600 over time results in a value of about zero. Thus, the reference threshold input to the comparator 506 can be set such it is not exceeded by the difference between the baseline integrated phase error response and the integrated phase error response resulting from the injected phase shift, and the output of the comparator 506 indicates a continued grid connection.

FIG. 7 is a graphical diagram of a phase error response 700 in the absence of a connected grid in accordance with one or more embodiments of the present invention. When the grid becomes disconnected from the micro-inverter 102, the grid voltage reference signal is no longer provided to the phase detector 402 and is replaced by a reference signal that is a product of the inverter current and the impedance of a load coupled to the inverter. As a result, the DPLL 304 does not provide compensation for the injected phase error, resulting in the unipolar phase error response 700. Integrating the phase error response 700 over time results in an increasing integrated phase error response value. The difference between the baseline integrated phase error response and the increasing integrated phase error response resulting from the injected phase shift will at some point exceed the reference threshold input to the comparator 506, generating an output of the comparator 506 indicating a potential grid disconnection. The reference threshold can be set such that the loss of the grid connection is rapidly detected.

Figure 8:
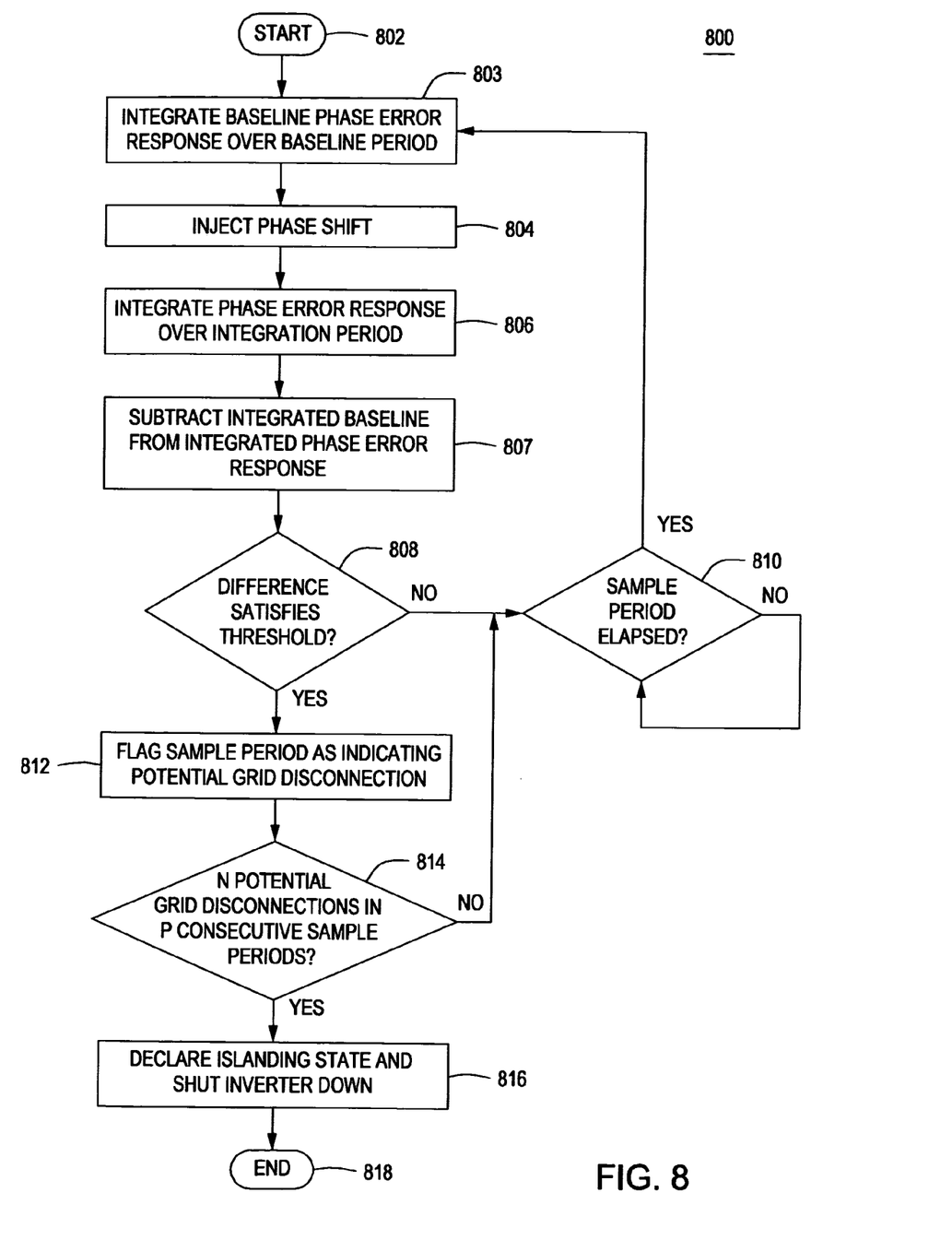
FIG. 8 is a flow diagram of a method for detecting an islanding state in a grid-connected inverter in accordance with one or more embodiments of the present invention.

FIG. 8 is a flow diagram of a method 800 for detecting an islanding state in a grid-connected inverter in accordance with one or more embodiments of the present invention. The method 800 begins at step 802 and proceeds to step 803. At step 803, at the start of a sample period, a baseline phase error response of the DPLL of an inverter is accumulated over a baseline period. In one embodiment, a sample period of 0.5 seconds and a baseline period of 116.667 milliseconds (i.e., seven cycles for a 60 Hz grid voltage) are utilized. The method proceeds to step 804. At step 804, a small phase shift is injected through the DPLL of the inverter such that the phase shift causes an insignificant distortion to the current injected into the grid. In one embodiment, the phase shift has a magnitude of 50 microseconds over a duration of 16.7 milliseconds (i.e., one cycle for a 60 Hz grid voltage). In alternative embodiments, the phase shift is injected through the DPLL of a micro-inverter.

The method 800 proceeds to step 806. At step 806, a phase error response of the DPLL resulting from the injected phase shift is accumulated over an integration period; in one embodiment, an integration period of 116.667 milliseconds (i.e., seven cycles for a 60 Hz grid voltage) is utilized. At step 807, the accumulated baseline phase error response is subtracted from the accumulated phase error response resulting from the injected phase shift, and, at step 808, the resulting difference is compared to a threshold. If the resulting difference does not satisfy the threshold, the method 800 proceeds to step 810. If the current sample period has not elapsed, the method 800 waits at step 810; if the current sample period has elapsed, the method 800 returns to step 803.

If the resulting difference satisfies the threshold at step 808, the method 800 proceeds to step 812. At step 812, the current sample period is flagged as indicating a potential grid disconnection. At step 814, the method 800 determines whether "n" potential grid disconnections have occurred within the "p" most recent consecutive sample periods; in one embodiment, the method 800 determines whether two potential grid disconnections have occurred within the three most recent consecutive sample periods. If the n-out-of-p potential grid disconnections have not occurred, the method 800 proceeds to step 810. If the n-out-of-p potential grid disconnections have occurred, the method 800 proceeds to step 816, where an islanding state is declared and the inverter is shut down. The method 800 then ends at step 818.

Figure 9:
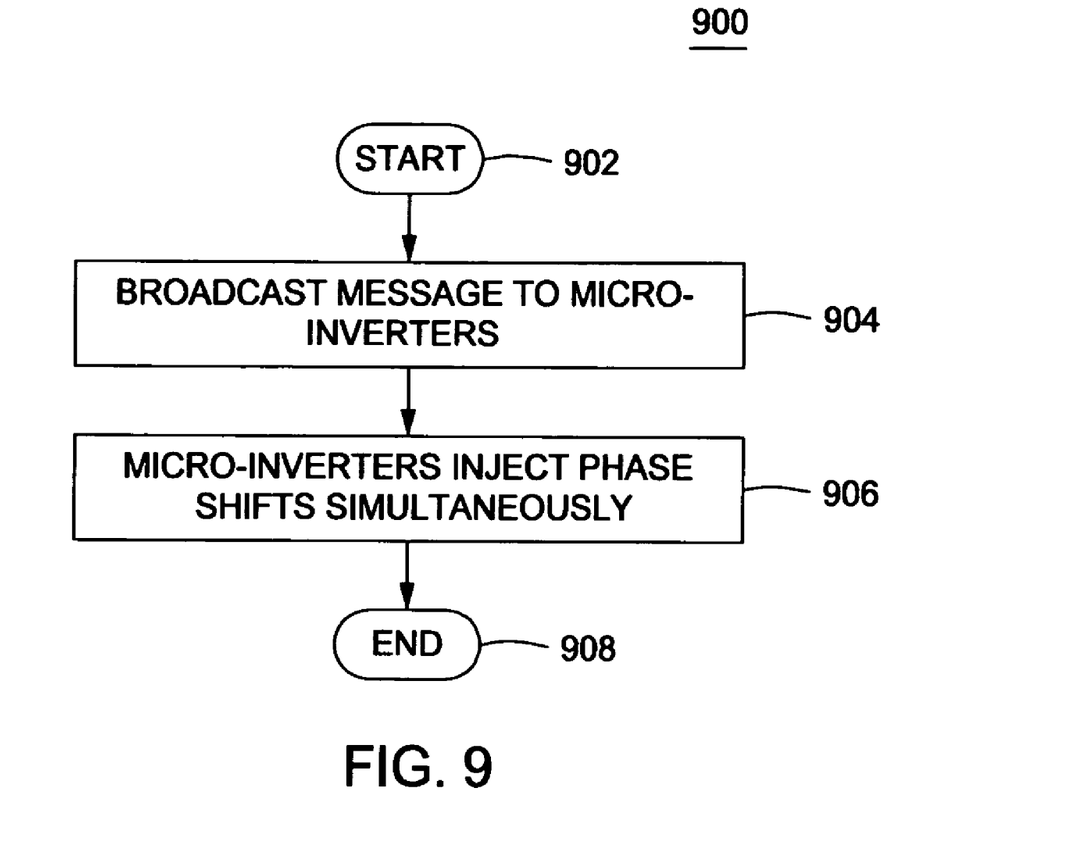
FIG. 9 is a flow diagram of a method for synchronizing phase shift injection in a plurality of micro-inverters in accordance with one or more embodiments of the present invention.

FIG. 9 is a flow diagram of a method 900 for synchronizing phase shift injection in a plurality of micro-inverters in accordance with one or more embodiments of the present invention. The method 900 begins at step 902 and proceeds to step 904. At step 904, a control module coupled to a plurality of micro-inverters, such as the control module 110 coupled to micro-inverters 102 via the AC bus 106, broadcasts a message to the plurality of micro-inverters. In one embodiment, the message comprises a millisecond timestamp. The method proceeds to step 906. At step 906, each micro-inverter of the plurality of micro-inverters simultaneously injects a phase shift through its DPLL, such as in the method 800 described above. The method 900 then ends at step 908.

While the foregoing is directed to embodiments of the present invention, other and further embodiments of the invention may be devised without departing from the basic scope thereof, and the scope thereof is determined by the claims that follow.

The invention claimed is:

1. Apparatus for determining an islanding state of a distributed power generator, comprising:
   a phase locked loop (PLL);
   a phase shift generator for injecting a phase shift into the PLL during at least one sample period; and
   a phase error signature monitor for monitoring at least one phase error response of the PLL during the at least one sample period and, based on the at least one phase error response, identifying the islanding state.

2. The apparatus of claim 1, wherein the phase error signature monitor:
   integrates the at least one phase error response over at least one integration period to obtain at least one integrated phase error response;
   compares the at least one integrated phase error response to at least one threshold; and
   flags the at least one sample period as indicative of a possible islanding state when the at least one integrated phase error response satisfies the at least one threshold.

3. The apparatus of claim 2, wherein the phase error signature monitor declares the islanding state when a first number of the at least one sample period within a second number of the at least one sample period are flagged as indicative of the possible islanding state.

4. The apparatus of claim 3, wherein the phase error signature monitor comprises at least one resettable integrator, a comparator, at least one sampler, a subtractor, and an islanding decision controller.

5. The apparatus of claim 4, wherein the islanding decision controller determines when the first number of the at least one sample period within the second number of the at least one sample period are flagged as indicative of the possible islanding state.

6. The apparatus of claim 5, wherein the second number of the at least one sample period are consecutive sample periods.

7. The apparatus of claim 6, wherein the phase shift is of a magnitude of 50 microseconds over a single cycle of a frequency of a commercial power grid.

8. The apparatus of claim 1, wherein the PLL, the phase shift generator, and the phase error signature monitor are within an inverter.

9. The apparatus of claim 1, wherein the at least one phase error response comprises a first phase error response and a second phase error response, wherein the first phase error response occurs prior to an injected phase shift and the second phase error response occurs after the injected phase shift.

10. The apparatus of claim 9, wherein the phase error signature monitor:
    integrates the first phase error response over a first integration period to obtain a first integrated phase response;
    integrates the second phase error response over a second integration period to obtain a second integrated phase error response;
    compares a difference between the first integrated phase error response and the second integrated phase error response to a threshold; and
    flags the at least one sample period as indicative of a possible islanding state when the difference satisfies the threshold.

11. A system for determining an islanding state of a distributed power generator, comprising:
    a plurality of inverters, wherein each inverter of the plurality of inverters comprises a phase locked loop (PLL), a phase shift generator for injecting a phase shift into the PLL during at least one sample period, and a phase error signature monitor for monitoring at least one phase error response of the PLL during the at least one sample period and, based on the at least one phase error response, identifying the islanding state; and
    a controller coupled to the plurality of inverters, wherein the controller communicates a message to the plurality of inverters that causes the phase shift generator of each of the inverters of the plurality of inverters to inject the phase shift simultaneously into the plurality of inverters.

12. The system of claim 11, wherein the at least one phase error response comprises a first phase error response and a second phase error response, wherein the first phase error response occurs prior to an injected phase shift and the second phase error response occurs after the injected phase shift.

13. The system of claim 11, wherein the plurality of inverters is a plurality of micro-inverters.

14. A method for determining an islanding state of a distributed power generator, comprising:
    injecting a phase shift into a phase locked loop (PLL) of an inverter, wherein the phase shift is injected during at least one sample period;
    integrating at least one phase error response of the PLL over at least one integration period to obtain at least one integrated phase error response;
    comparing the at least one integrated phase error response to at least one threshold; and
    flagging the at least one sample period as indicative of a possible islanding state when the at least one integrated phase error response satisfies the at least one threshold.

15. The method of claim 14, further comprising declaring the islanding state when a first number of the at least one sample period within a second number of the at least one sample period are flagged as indicative of the possible islanding state.

16. The method of claim 15, wherein the second number of the at least one sample period are consecutive sample periods.

17. The method of claim 16, wherein the phase shift is of a magnitude of 50 microseconds over a single cycle of a frequency of a commercial power grid, wherein the commercial power grid is coupled to the inverter.

18. The method of claim 16, further comprising communicating a message to a plurality of inverters, wherein the message causes each inverter of the plurality of inverters to inject the phase shift simultaneously.

19. The method of claim 14, wherein the inverter is a micro-inverter.

20. The method of claim 18, wherein the plurality of inverters are micro-inverters.

21. The method of claim 14, wherein the integrating step comprises integrating a first phase error response over a first integration period to obtain a first integrated phase error response and a second phase error response over a second integration period to obtain a second integrated phase error response, wherein the first phase error response occurs prior to the injecting step and the second phase error response occurs after the injecting step; and wherein the at least one integrated phase response of the comparing and the flagging steps comprises a difference between the first and the second integrated phase error responses.

* * * * *